Figure 1:
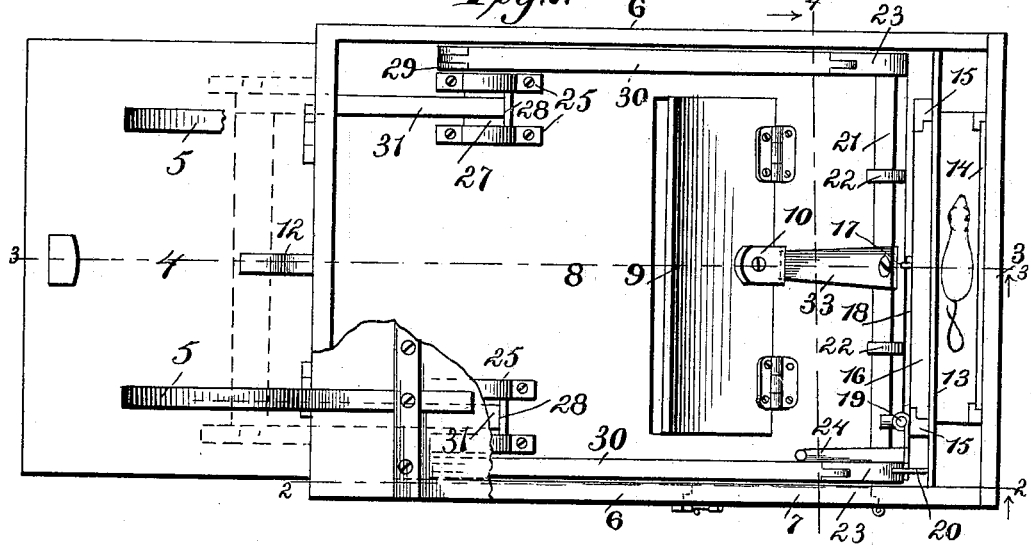

No. 610,755. Patented Sept. 13, 1898.
E. CARPENTER.
TRAP.
(Application filed Apr. 16, 1898.)
(No Model.) 2 Sheets—Sheet 1.

Witnesses:
Geo. E. Fuch.
J. H. Jochum Jr.

Inventor:
Ezra Carpenter,
By Collamer & Co.,
Attorneys.

THE NORRIS PETERS CO., PHOTO-LITHO., WASHINGTON, D. C.

No. 610,755. Patented Sept. 13, 1898.
E. CARPENTER.
TRAP.
(Application filed Apr. 16, 1898.)
(No Model.) 2 Sheets—Sheet 2.
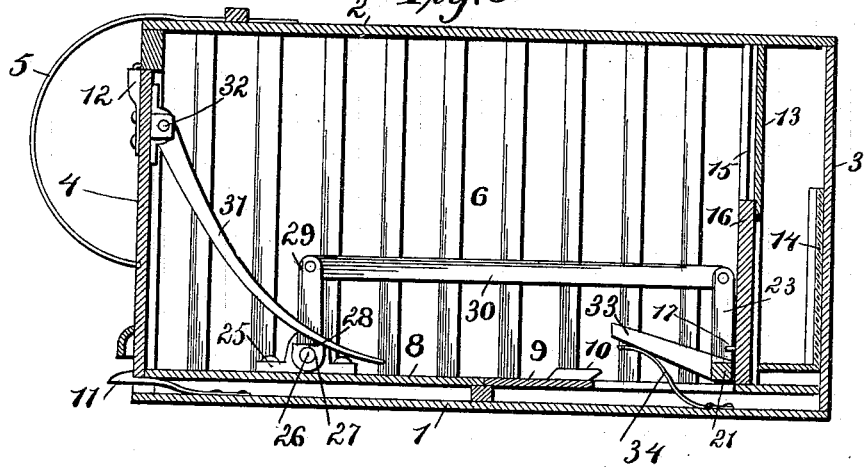
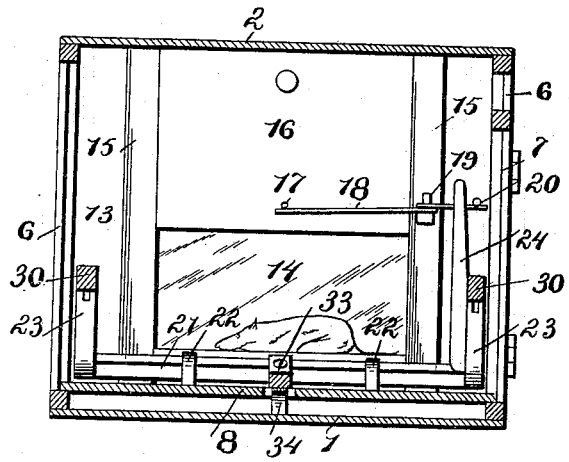
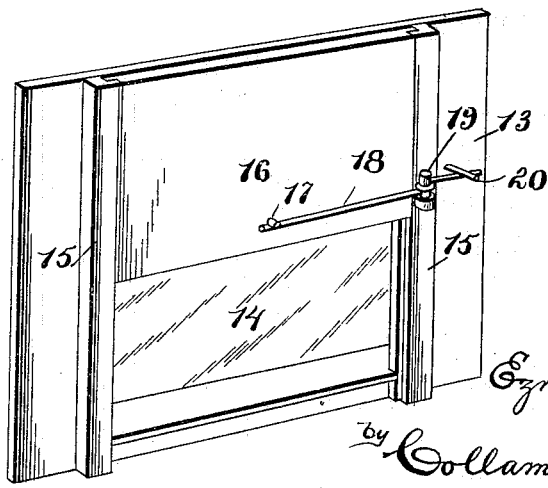
Witnesses: Geo. E. Frech, J. H. Jochum Jr.
Inventor: Ezra Carpenter, by Collamer & Co., Attorneys.

UNITED STATES PATENT OFFICE.

EZRA CARPENTER, OF FISHERMAN'S BAY, CALIFORNIA.

TRAP.

SPECIFICATION forming part of Letters Patent No. 610,755, dated September 13, 1898.

Application filed April 16, 1898. Serial No. 677,824. (No model.)

*To all whom it may concern:*

Be it known that I, EZRA CARPENTER, a citizen of the United States, and a resident of Fisherman's Bay, Sonoma county, State of California, have invented certain new and useful Improvements in Traps; and my preferred manner of carrying out the invention is set forth in the following full, clear, and exact description, terminating with the claims particularly specifying the novelty.

This invention relates to trapping, and more especially to that class of traps known as "cage;" and the object of the same is to produce an improved trap of this character adapted in its various sizes to catch all varieties of animals from mice to panthers.

To this end the invention consists in the trap hereinafter more fully described and claimed, and as illustrated in the drawings, wherein—

Figure 2:
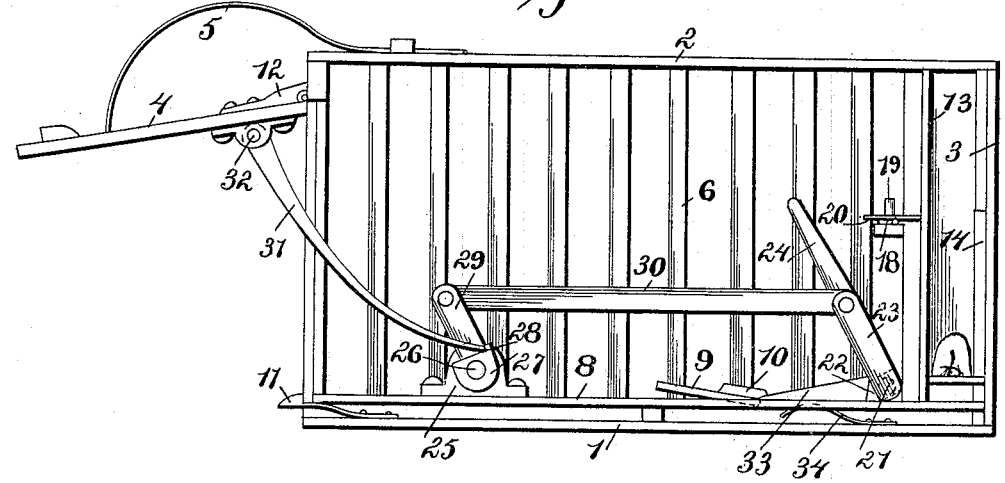
Figure 5:
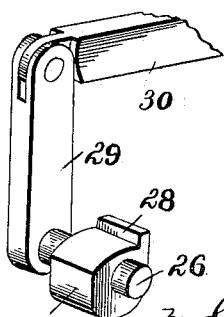

Figure 1 is a plan view with the cover removed, showing the trap as set and all doors as open. Fig. 2 is a vertical section on the line 2 2 of Fig. 1, looking in the direction of the arrows. Fig. 3 is a central vertical section, but with the trap closed. Fig. 4 is a cross-section on the line 4 4 of Fig. 1 with the trap open, looking in the direction of the arrows. Fig 5 is an enlarged perspective detail of one of the tripper-cams. Fig. 6 is a similar detail of the mechanism for tripping the door of the decoy-chamber.

The body of this trap comprises the main bottom 1, a top or cover 2, (which may have doors, as will be clear, although they are not shown in the present instance,) a closed rear end 3, a hinged inlet-door 4, normally thrown to its closed position by springs 5 of any suitable character, open sides 6, composed of slats of wood or in some cases of wire-netting or iron bars, and one of said sides preferably having a manual door 7, mounted on hinges and held closed by bolts, through which door access may be had to the interior for the purpose of setting the trap, placing the decoy, and removing the animal caught. However, the door or doors in the top or cover could be used for this purpose, if preferred, and possibly the side door 7 might be then omitted.

At a slight distance above the main bottom 1 is located a false bottom 8, provided at about its mid-length with a trap-door 9, here shown as hinged at its rear edge and carrying a rearwardly-projecting finger 10, which door is adapted to be turned down flush with the upper face of the false bottom. Between the latter and the true bottom is located one or more catches 11, projecting beyond the front of the trap and adapted to engage the lower edge of the inlet-door when it is in a closed position. Said door may also have a stop 12 on its outer face adjacent its upper hinged edge, so as to prevent its being opened too far.

Within the trap, near its rear end, is a partition 13, dividing the interior into a main chamber and a decoy-chamber, which latter preferably has a mirror 14 on the inner wall of the rear end of the trap. In the lower portion of this partition is an opening having upright guides 15 at its edges, and in said guides slides a gravity-door 16, adapted, when it drops, to close the opening through the partition, and hence to separate the decoy-chamber from the main chamber of the trap. As best seen in Fig. 6, a pin 17 projects from the front face of this door 16 and is adapted to rest on the inner end of a lever 18, which has an eye mounted on an upright pin 19, carried by one of the guides 15, and whose outer end slides beneath a horizontal pin 20, which holds that end down and the inner end up, so that the latter can support the weight of the door 16.

The tripping mechanism consists of a rock-shaft 21, extending across the interior of the main chamber and journaled in eyes or bearings 22 just in front of the gravity-door 16, each end of said rock-shaft having an upright elbow 23 and one end also carrying an upright finger 24, adapted to strike the outer end of the lever 18 when the finger moves to the rear. In Fig. 5 is shown in detail one of the tripping-cams, of which there are two located near the sides and near the front end of the main chamber.

25 are two bearings mounted on the false bottom 8 and in which are journaled stub-shafts 26 at the extremities of a cam 27, whose body stands between the bearings and has a notch 28, and 29 is an elbow rising from the outer stub-shaft. The elbows 23 and 29 are connected in pairs at the sides of the trap by links 30, so that the oscillation of the rock-shaft 21 causes a similar movement of the cams.

31 are push-bars pivoted at their upper ends, as at 32, to the inner side of the inlet-door 4, near its hinges, and having long, curved, and tapered bodies, each coming nearly to a point at its inner end, and said inner ends are of a size adapted to rest on the cams against the notches therein and between the bearings therefor.

33 is a trigger secured rigidly to the center of the rock-shaft 21, projecting forwardly therefrom and working in a slot in the false bottom 8, through which projects a spring 34, holding this trigger normally raised, and the length of the latter is such that it is adapted to clear the rear end of the finger 10 when the trap-door 9 is lowered.

All parts of this machine are of the desired sizes, shapes, proportions, and materials, and such changes in and additions to the details of construction may be made as appear advisable under varying circumstances and according to the different uses to which the trap is to be put, all without departing from the principle of my invention.

In operation the manual door 7 in the side (or a similar door or doors in the top) is opened to permit the operator to gain access to the interior. The gravity-door 16 is raised and its pin 17 engaged over the inner end of the lever 18, thus exposing the front of the decoy-chamber, in which latter is then placed a dead bait or in some cases a live decoy, which may be fastened within this chamber in any suitable manner. The trigger 33 is then depressed against the force of its spring 34 and the trap-door 9 raised until the tip of its finger 10 passes over the tip of the trigger 33. The movement of the latter rocks forward the shaft 21 and both of the cams 27, as will be clear, and the inlet-door 4 is now disconnected from its catch 11 and raised against the tension of its springs 5 until its stop 12 prevents further rising. At this time it will be found that the push-bars 31 have been drawn forward over the cams until their rear ends drop into and are engaged in front of the notches 28 in the latter. The manual door or doors are then closed and locked, and the trap is ready for use. The (preferably live) decoy or bait will attract the victim through his sense of scent, and on approaching the inlet end of the trap he looks through the main chamber, through the opening in the partition 13, at and past the decoy, and into the mirror 14, where he sees one of his own kind apparently approaching from the opposite direction to consume the bait. The fact that the sides of the trap are open causes its interior to be light, and hence the most wary animal will hardly be too timid to be caught. Entering through the open front end under the door 4 and approaching the bait or decoy stealthily, the victim proceeds to about the mid-length of the trap, when he steps on the door 9. As the latter assumes its horizontal position its finger 10 releases the tip of the trigger 33, which latter is thrown upward by its spring 34. This turns the rock-shaft 21 suddenly to the rear, draws on the links 30, rocks the cams 27 to the rear, and causes their notches 28 to release the tips of the push-bars 31, upon which action the springs 5 immediately slam the inlet-door 4 closed, and the catch 11 holds it in that position. The rearward movement of the rock-shaft 21 also throws the finger 24 to the rear, and its upper end strikes the outer end of the lever 18 and moves it quickly to the rear under the pin 20. This throws its inner end forward out of engagement with the supporting-pin 17, and the gravity-door 16 immediately falls in its guides 15, thus cutting off the main chamber containing the victim from the decoy-chamber containing the bait or possibly a live decoy animal or fowl.

From time to time the operator visits his traps, kills the victims and withdraws them or removes them alive, and then resets each trap and possibly feeds the decoy, if the latter is a live animal or fowl.

This trap possesses advantages over others now in use in that it is humane in all respects, even to the most ferocious victims, as well as to the decoy, if the latter is alive. Its openwork or slatted sides serve to prevent the frightening of the victim which all closed or caged traps will do to a greater or less extent, and the action of the tripping mechanism under the impulse of the spring 34 when the trap-door 9 is depressed is assisted by the spring or springs 5 and the weight of the inlet-door 4 communicated through the push-bars 31 to the cams and tending to turn them to the rear.

What is claimed as new is—

1. In a trap, the combination with a body, an inlet-door at its front end, a partition within the body forming a decoy-chamber at its rear end and having an opening near its lower edge, upright guides adjacent said opening, and a gravity-door sliding in the guides; of devices for holding both said doors open, and victim-actuated mechanism for tripping said devices simultaneously, as and for the purpose set forth.

2. In a trap, the combination with a body having a mirror across its rear end, a door near said mirror and forming a decoy-chamber within the body at its rear end, and an inlet-door at the front end of the body; of devices for holding both said doors open, and victim-actuated mechanism for tripping said devices simultaneously, as and for the purpose set forth.

3. In a trap, the combination with a body having a decoy-chamber at its rear end, a transverse partition forward of said chamber having an opening near its lower edge, upright guides alongside said opening, a gravity-door moving in said guides, and a pin in said door; of a lever pivoted between its extremities with its inner end adapted to engage the pin in the door, a fixed pin beneath which its outer end slides, an inlet-door in the front of the body, devices for holding this door open, and victim-actuated mechanism for tripping said devices and simultaneously moving the outer end of said lever to the rear to release the gravity-door, as and for the purpose set forth.

4. In a trap, the combination with a body having a decoy-chamber at its rear end, a transverse partition forward of said chamber having an opening near its lower edge, upright guides alongside said opening, a gravity-door moving in said guides, and a pin in said door; of a lever pivoted between its extremities with its inner end adapted to engage the pin in the door, a rock-shaft across the body forward of the partition, means for normally turning this shaft to the rear, a finger thereon adapted to strike the outer arm of said lever, victim-actuated mechanism for tripping said shaft, an inlet-door in the front end of the body, devices for holding it open, and connections between said shaft and devices, as and for the purpose set forth.

5. In a trap, the combination with a body having slatted sides and a false bottom with an opening in the latter, a trap-door hinged in the opening and having a finger projecting from its hinge-line, a rock-shaft journaled across the body and having a trigger adapted to be engaged by said finger, and a spring turning the rock-shaft normally to the rear; of an inlet-door in the front of the body, devices for holding said door open, and connections between said rock-shaft and devices, for tripping the latter when the trap-door is depressed, substantially as described.

6. In a trap, the combination with a body having a manual door in its side and an inlet-door in its front end, a false bottom within the body, a trap-door hinged to said bottom and having a finger projecting over its hinge-line, a rock-shaft journaled across the body and having a trigger adapted to be engaged by said finger, and a spring beneath said trigger turning the shaft normally to the rear; of a catch between the true and false bottom projecting beyond its front to engage the inlet-door when closed, devices for holding said inlet-door open, and connections between the rock-shaft and said devices, for tripping the latter when the trap-door is depressed, substantially as described.

7. In a trap, the combination with a body having an open front, an inlet-door hinged at its upper end therein and having a stop adjacent its hinge-line, springs for throwing said door normally closed, and a catch for holding it in closed position; of a trap-door hinged within the body remote from its front end and having a finger, a trigger adapted to be engaged by said finger when the trap-door is raised, devices for holding the front door open against the tension of its spring, and connections between said trigger and devices, for tripping the latter when the trap-door is depressed, substantially as described.

8. In a trap, the combination with a body having a spring-actuated inlet-door in its front end, a trigger within the body near its rear end, a spring normally raising said trigger, and victim-actuated devices for holding said trigger depressed; of a cam journaled in bearings within the body and having a notch in its upper side, a push-bar on the door whose extremity engages said notch when the door is open, an elbow on one shaft of the cam, and connections between said trigger and elbow for moving the latter when the trigger is released, substantially as described.

9. In a trap, the combination with a body, a spring-closed door in its front end, a rock-shaft journaled across the body near its rear end and provided with elbows at its extremities, a spring turning this shaft normally to the rear, and victim-actuated devices for holding the shaft against the tendency of its spring; of two pairs of bearings mounted within the body near its front end, a cam having stub-shafts journaled in each pair of bearings and a forwardly-facing notch in its body, push-bars pivoted to the interior of the door with their tips engaging said notches when the door is open, elbows rising from the outer stub-shafts on the cams, and links connecting these elbows with those on the rock-shaft, as and for the purpose set forth.

In testimony whereof I have hereunto subscribed my signature on this the 8th day of April, A. D. 1898.

EZRA CARPENTER.

Witnesses:
  JOE IRWIN,
  GRACE RICHARDSON.